United States Patent [19]
Matthews

[11] 3,728,533
[45] Apr. 17, 1973

[54] CIRCUIT FOR AVOIDING FALSE LOCK

[75] Inventor: Solomon Bertram Matthews, Montreal, Quebec, Canada

[73] Assignee: Canadian Marconi Company, Montreal, Quebec, Canada

[22] Filed: Aug. 16, 1971

[21] Appl. No.: 171,971

[30] Foreign Application Priority Data

Sept. 23, 1970 Canada..........................094,050

[52] U.S. Cl...................235/181, 235/152, 343/12 A, 343/17.2 R
[51] Int. Cl. ...........................G06f 15/34, G01s 7/28
[58] Field of Search .......................343/12 A, 17.1 R, 343/17.2 R, 17.2 PC; 235/181

[56] References Cited

UNITED STATES PATENTS 3,663,935   5/1972   MacMullen......................343/17.2 R

*Primary Examiner*—T. H. Tubbesing
*Attorney*—Melvin Sher

[57] ABSTRACT

It is well known that the autocorrelation function of a psuedo-random sequence, multiplied by itself delayed, theoretically consists of one peak at zero delay and approximately zero amplitude at all other delays. It is also known that, in practice, there are second order effects which give rise to secondary peaks at delays other than zero. In a system such a pseudo-randomly phase modulated radar altimeter, which utilizes the autocorrelation peak to lock on and track, the appearance of secondary peaks may cause false locks. The instant invention is directed at means for avoiding false locks, and comprises means for altering the pseudo-random sequences of the modulating code generator and the tracking code generator at a predetermined rate. The timing of the alteration is such that the sequence of the modulating code generator will be altered only when there exists in the modulating code generator a predetermined word, e.g., the all ones state. The sequence of the tracking code generator is altered the first time that the same predetermined word exists in the tracking code generator after the sequence of the modulating code generator has been altered.

4 Claims, 3 Drawing Figures

PATENTED APR 17 1973          3,728,533
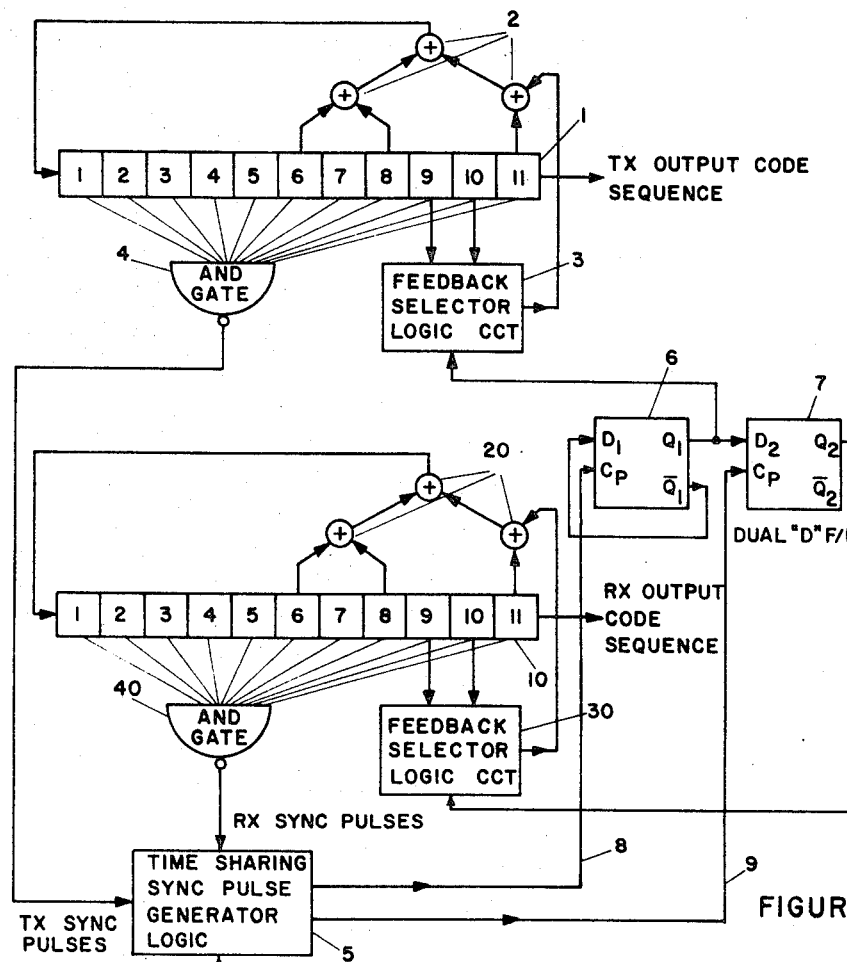
FIGURE 2
FIGURE 1a
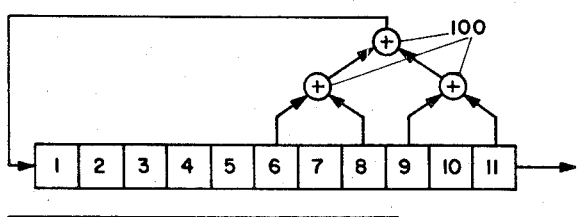
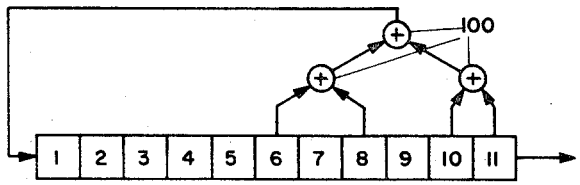
FIGURE 1b
⊕ — MODULO 2 ADDERS, IE EXCLUSIVE OR GATES.
▯ — FLIP-FLOP STAGES IN SHIFT REGISTER
*INVENTOR*
S. B. MATTHEWS

CIRCUIT FOR AVOIDING FALSE LOCK

This invention relates to a method for avoiding false locks in a self-contained echo type range measuring system which measures the time delay between a transmitted signal and its echo wherein the transmitted signal is a pseudo-randomly modulated signal and the delay measurement is made by cross correlating the transmitted signal with a received echo signal, and to apparatus for carrying out the method.

Such systems may comprise pseudo-randomly phase modulated radar altimeters, laser range finders, intrusion detection radars, sonars, etc. The modulation may be phase modulation, frequency modulation, and/or amplitude modulation, just so long as it is pseudo-random and delay cross correlation tracking is used. However, the disclosure will be restricted to a discussion concerning only the pseudo-randomly phase modulated radar altimeter.

It is well known that the autocorrelation function of a pseudo-random sequence theoretically consists of one peak at zero delay and approximately zero amplitude at all other delays. (See, for example, page 6 of DRTE Report No. 1031 by Davies, N.G., titled "Some Properties of Linear Recursive Sequences" dated December 1959.). It is equally well known that, in practice, there are second order effects which give rise to small peaks in the autocorrelation function at delays other than zero. These second order peaks may be caused either by ground returns or leaks between transmitter and receiver, and although they are typically of the order of 30 db to 80 db below the main autocorrelation peak, they may nevertheless cause false locks in a system such as described in our copending U.S. Pat. application Ser. No. 172,071 filed Aug. 16, 1971.

It is, therefore, an object of the invention to provide a circuit for the avoidance of false locks as above described.

The invention will be understood by examination of the following description together with the accompanying drawings in which:

FIGS. 1a and 1b illustrate two different feedback connections which may be used to derive a pseudo-random sequence with an 11 stage shift register; and FIG. 2 illustrates a circuit which comprises one embodiment of the invention.

It is well known that pseudo-noise (pseudo-random) sequences may be produced by a shift register with appropriate feedback connections. (See for example, Electron Technology, October 1960, page 389 et seq, Shift Registers, Scholfield, or IEEE Transactions on Communication Technology, Vol. COM-13, No. 4, December 1965, page 475 et seq, Acquisition of Pseudo-noise Signals by Sequential Estimation, Ward.)

FIGS. 1a and 1b illustrate two feedback connections for producing maximal length pseudo-random sequences from an 11 stage shift register. In FIG. 1a and 1b, 1–11 represent the flip-flops in an 11 stage shift register and 100 represents modulo 2 adders, i.e. EXCLUSIVE OR gates. In FIG. 1a, the feedback connections are from stages 6, 8, 9 and 11 and in FIG. 1b the feedback connections are from stages 6, 8, 10 and 11. As is well known, other feedback connections will produce a pseudo-random sequence from an 11 stage register, nor is the number of feedback taps restricted to four, or the number of stages restricted to 11. However, although different feedback connections will produce pseudo-random sequences having the same autocorrelation function, the sequences produced by the different arrangements will be different, i.e., the specific times of appearance of ones and zeroes will be different for the different arrangements although the ones and zeroes in both arrangements will appear in a pseudo-random fashion.

Secondary peaks will be produced no matter which feedback connections are used; however, these secondary peaks will occur at different positions relative to the zero delay peaks. The autocorrelation function of the sequence, however, is not a function of the feedback connections, but only of the number of stages in the sequence producing shift register, so long as the feedback connections produce a pseudo-random sequence.

This phenomenon can be used to detect false locks as follows: the feedback connections of the sequence producing shift register are periodically altered, for example, as between two or more different sequences. If, while the register is in one feedback position, the system locks onto a secondary peak, then when the feedback connection is altered, there will no longer be a secondary peak in the same relative position so that the system will no longer be locked. If, however, the system is locked onto the primary (zero delay) peak, when the feedback connections are altered, the primary peak will remain in the same relative position so that the system will remain locked onto this peak.

It can be seen that, by providing means for altering the feedback connections in the sequence producing shift registers, a means is provided for detecting false locks.

However, a critical point is the time at which the feedback connections are switched. It is, of course, well known that in a system such as described in our copending U.S. application Ser. No. 172,071, both a modulating (transmitter) code generator and a tracking (receiver) code generator are required. In order to effect the instant invention, it is necessary to alter the sequences of both generators in such a way that the feedback connections of both generators become the same. However, it can be shown that both generators cannot have their sequences changed at the exact same time without providing a circuit which determines binary words corresponding to particular delays. This effect can be explained as follows: if we consider a modulating and tracking code generator at one instant in time, then the modulating code generator will have a binary word which we will call $b_1$ and the tracking code generator will have a binary word which we will call $b_2$. Assuming the system is tracking, the delay between $b_1$ and $b_2$ is $D_1$ where $D_1$ corresponds to the altitude delay, i.e. at this particular altitude, and with this particular clocking pulse rate, and with this particular sequence, the binary word $b_2$ will appear $D_1$ time units after the appearance of $b_1$. If the feedback connections were to be altered at this moment in time, the binary words in both registers would be unchanged immediately after the alteration took place. However, because the sequences have been changed, the delay between $b_1$ and $b_2$ is no longer $D_1$, but some other delay $D_2$, i.e., the tracking code generator is now delayed from the modulating code generator by a delay $D_2$ different than $D_1$. Thus, the system would no longer be tracking, and it would be necessary for the system to reacquire.

It has been discovered that if the sequences are altered when a predetermined word, e.g., the all ones state, exists in the generators, in such a manner that the feedback connections of the modulating code generator are switched when that word exists in the modulating code generator and the feedback connections of the tracking code generator are switched, not at that same instant of time, but at the time immediately following the switching of the modulating code generator, when the predetermined word exists in the tracking code generator, then the delay between the binary words in the generators will not be altered by the switching action. It will, of course, be appreciated that the feedback connections will not be changed every time the predetermined binary word appears, but that they will be changed at a predetermined rate synchronized by the predetermined binary words.

FIG. 2 illustrates one circuit for implementing the above action. In FIG. 2, 1 and 10 are 11 stage shift registers and 2 and 20 are modulo adders through which feedback connections are effected in registers 1 and 10 respectively. As can be seen, the feedback connections are from stage 6, 8, 9 and 11 or 6, 8, 10 and 11 depending on the states of the feedback selector logic circuits 3 and 30. The output terminals of each stage of the registers are fed to the input terminals of 11-input AND gates 4 and 40, and the outputs of the AND gates are fed to two separate inputs of time sharing sync pulse generator 5.

The generator 5 has a square wave applied at a further input terminal thereof and provides, on its output line 8, the first output pulse of AND gate 4 after the input square wave has changed sign and, on the output line 9, the first output pulse of AND gate 40 after the input square wave has changed sign. In this way, clock pulses are provided to D flip-flop 6 at the input square wave rate, but synchronized to the occurrence of the all ones state of shift register 1. In a like manner, clock pulses are provided to D flip-flop 7 at the input square wave rate and synchronized to the occurrence of the all ones state in shift register 10. (The D flip-flop is a J-K flip-flop with the J and K terminals connected.) The feedback connection selected by the circuits 3 and 30 is a function of the state of the signal applied to the circuits 3 and 30 at their control terminals from the Q terminals of the D flip-flops.

In operation, when a clock pulse is applied to flip-flop 6, the $Q_1$ terminal will assume the state of the $D_1$ terminal. Simultaneously, in view of the fact that the $\bar{Q}_1$ terminal is of the opposite state to the $Q_1$ terminal, and in view of the fact that the $\bar{Q}_1$ terminal is connected to the $D_1$ terminal, the $D_1$ terminal will change states. This ensures that the $Q_1$ terminal alternates states on alternate clock pulses.

The $Q_2$ terminal of the flip-flop 7 follows the output of the $Q_1$ terminal with a delay equal to the delay between the all ones state of the modulating code generator and the all ones state of the tracking code generator.

Thus it can be seen that the feedback connections of the generators will be changed at a predetermined rate and only when a predetermined word (the all ones state) exists in the generators, and that the feedback connections of the modulating code generator will be changed before the feedback connections of the tracking code generator are changed.

Although a specific embodiment has been described above, it is understood that this was for the purpose of illustrating, but not limiting, the invention. Various modifications which will come readily to the mind of one skilled in the art are considered to be within the scope of the invention as defined in the appended claims.

I claim:

1. In a system comprising two generators for producing identical pseudo-random sequences of a given length; said generators each comprising a shift register having a plurality of stages and a set of feedback connections from a number of said stages through modulo 2 adders to the input stage of the shift register; said generators being adapted to produce a different pseudo-random sequence of the same length when said feedback connections are appropriately altered; means for altering said feedback connections of one of said generators to produce said different pseudo-random sequence when a predetermined binary word exists in said one generator; and means for altering the feedback connections of the other one of said generators to produce said different pseudo-random sequence after said feedback connections have been altered in said one generator and when said predetermined binary word exists in said other generator.

2. A system as defined in claim 1 wherein said means for altering the feedback connections of said one generator are further adapted to return said feedback connections to said set of feedback connections after a predetermined time and when said predetermined binary word exists in said one generator and the feedback connections comprise said altered feedback connections; and wherein the means for altering the feedback connections of said other generator are further adapted to return said feedback connections to said set of feedback connections after a predetermined time and when said predetermined binary word exists in said other generator and the feedback connections comprise said altered feedback connections.

3. A system as defined in claim 2 wherein said first generator comprises eleven serially connected flip-flops, each flip-flop comprising an input terminal and an output terminal; and further comprising three modulo 2 adders, each adder comprising two input terminals and an output terminal; and feedback selector logic means comprising two input terminals, an output terminal, and a control terminal; the output terminals of said sixth and eighth flip-flops being connected respectively to the first and second input terminals of one of said modulo 2 adders; the output terminals of said ninth and tenth flip-flops being connected respectively to the first and second input terminals of said feedback selector logic means; the output terminal of the eleventh flip-flop being connected to one input terminal of a second modulo 2 adder, and the output terminal of said feedback selector logic means being connected to the second input terminal of said second modulo 2 adder; the output terminals of said first and second modulo 2 adders being connected respectively to the first and second input terminals of said third modulo 2 adder, the output terminal of said third modulo 2 adder being connected to the input terminal of the first flip-flop; and the control terminal of said feedback selector logic means being connected to means for detecting said predetermined binary word in said first generator; wherein said feedback selector logic means comprises said means for altering the feedback connections of said one generator; whereby said feedback connections of said one generator alternate between feedback from sixth, eighth, ninth and eleventh flip-flop output terminals and feedback from said sixth, eighth, tenth and eleventh flip-flop output terminals; and wherein said second generator comprises a further eleven serially connected flip-flops, each further flip-flop comprising an input terminal and an output terminal; and further comprising three further modulo 2 adders, each further adder comprising two input terminals and an output terminal; and a further feedback selector logic means comprising two input terminals, an output terminal and a control terminal; the output terminals of said further sixth and eighth flip-flops being connected respectively to the first and second input terminals of one of said further modulo 2 adders; the output terminals of said further ninth and tenth flip-flops being connected respectively to the first and second input terminals of said further feedback selector logic means; the output terminal of the further eleventh flip-flop being connected to one input terminal of a second further modulo 2 adder, and the output terminal of said further feedback selector logic means being connected to the second input terminal of said further second modulo 2 adder; the output terminals of said further first and second modulo 2 adders being connected respectively to the first and second input terminals of said further third modulo 2 adder, the output terminal of said further third modulo 2 adder being connected to the input terminal of the further first flip-flop; and the control terminal of said further feedback selector logic means being connected to further means for detecting said predetermined word in said second generator; wherein said further feedback selector logic means comprises said means for altering the feedback connections of said second generator; whereby said feedback connections of said second generator alternate between feedback from said sixth, eighth, ninth and eleventh flip-flop output terminals and feedback from said sixth, eighth, tenth and eleventh flip-flop output terminals.

4. A system as defined in claim 3 wherein said means for detecting said predetermined binary word in said first generator comprises a first 11-input AND gate, the output terminals of each of said eleven flip-flops being connected respectively to a different input of said AND gate; and wherein said means for detecting said predetermined binary word in said second generator comprises a second 11-input AND gate, the output terminals of each of said further eleven flip-flops being connected respectively to a different input of said second AND gate; and further comprising a time sharing sync pulse generator having three input terminals and two output terminals; and two D flip-flops, each having a D input terminal and a clock pulse input terminal, and Q and $\bar{Q}$ output terminals; the output terminals of said first and second AND gates being connected respectively to the first and second input terminals of said time sharing sync pulse generator; and a source of square waves being connected to the third input terminal of said time sharing sync pulse generator; one output terminal of said sync pulse generator being connected to the clock pulse terminal of one of said D flip-flops, the other output terminal of said sync pulse generator being connected to the clock pulse terminal of said other D flip-flop; the Q output terminal of said first D flip-flop being connected to the control terminal of said feedback selector logic means and the Q output terminal of said second D flip-flop being connected to the control terminal of said further feedback selector logic means, the $\bar{Q}$ output terminal of said first D flip-flop being connected to the D input terminal of said first D flip-flop, and the Q output terminal of said first D flip-flop being further connected to the D input terminal of said second D flip-flop; whereby clock pulses at said square wave rate and synchronized with the output of said first AND gate are provided to the clock pulse input terminal of said first D flip-flop; and clock pulses at said square wave rate and synchronized with the output of said second AND gate are provided to the clock pulse input terminal of said second D flip-flop.

* * * * *